(12) United States Patent
Fang et al.

(10) Patent No.: US 9,199,871 B2
(45) Date of Patent: Dec. 1, 2015

(54) CONTINUOUS STRENGTHENING DEVICE AND A STRENGTHENING METHOD THEREOF

(71) Applicant: TPK LENS SOLUTIONS (XIAMEN) INC., Xiamen (CN)

(72) Inventors: Chung-Hao Fang, Kaohsiung (TW); Zhuping Gao, Xuyi County (CN); Lingling Jiang, Quanzhou (CN)

(73) Assignee: TPK Lens Solutions Inc., Xiamen (CN)

( * ) Notice: Subject to any disclaimer, the term of this patent is extended or adjusted under 35 U.S.C. 154(b) by 182 days.

(21) Appl. No.: 13/901,531

(22) Filed: May 23, 2013

(65) Prior Publication Data

US 2014/0033769 A1 Feb. 6, 2014

(30) Foreign Application Priority Data

May 26, 2012 (CN) .......................... 2012 1 0180690

(51) Int. Cl.
C03B 25/08 (2006.01)
C03B 29/08 (2006.01)

(52) U.S. Cl.
CPC ................ *C03B 25/08* (2013.01); *C03B 29/08* (2013.01)

(58) Field of Classification Search
USPC .......................................... 65/118, 355, 158
IPC ....................................................... C03B 25/08
See application file for complete search history.

(56) References Cited

FOREIGN PATENT DOCUMENTS

| TW | M387103 | 3/2010 |
|----|---------|--------|
| TW | M407246 | 7/2011 |

OTHER PUBLICATIONS

Hongjiang Du, CN 101514077, Description, Claims, Drawings, machine translation, Aug. 2009.*

* cited by examiner

*Primary Examiner* — Mark Halpern
(74) *Attorney, Agent, or Firm* — Gokalp Bayramoglu

(57) ABSTRACT

The present disclosure provides a continuous strengthening device comprising a bracket, at least a strengthening furnace located below the bracket and at least a pre-heating/annealing furnace movably located on the bracket. The strengthening furnace comprises a first furnace body having a first opening located on the top and a first movable furnace cover movably located on the top of the first furnace body for sealing the first opening. The pre-heating/annealing furnace comprises a second furnace body having a second opening located on the bottom and a second movable furnace cover movably located on the bottom of the second furnace body for sealing the second opening. In operation, while the pre-heating/annealing furnace moved onto the strengthening furnace, the first movable furnace cover and the second movable furnace cover both open, so that furnace bodies of the pre-heating/annealing furnace and the strengthening furnace are connected to form an airtight space.

20 Claims, 9 Drawing Sheets

CONTINUOUS STRENGTHENING DEVICE AND A STRENGTHENING METHOD THEREOF

This application claims the benefit of Chinese application No. 201210180690.4, filed on May 26, 2012.

BACKGROUND OF THE INVENTION

1. Field of the Invention

The present disclosure relates to a heating device, and more particularly relates to a continuous strengthening device and a strengthening method thereof.

2. Description of the Related Art

At present, before the glass is used in the products, such as touch panel, the glass needs to be strengthened to increase the degree of strength thereof, so as to make the glass have characteristics of no deformation and high impact resistance. The strengthening process needs to be done in an airtight space to avoid glass exposure and deformation.

A traditional single-furnace strengthening device comprises a separately set pre-heating/annealing furnace and a separately set strengthening furnace. During strengthening the glass, the glass is placed in the pre-heating/annealing furnace first, and then transferred into the strengthening furnace for strengthening after pre-heating. At last, the glass is retransferred into the pre-heating/annealing furnace and annealed by the pre-heating/annealing furnace. During the production process, processes of transferring the glass into the strengthening furnace for strengthening after the glass is pre-heated and transferring the glass into the annealing furnace for annealing after strengthened easily make the glass expose to air. In the second of the glass contacting the air, temperature of the glass dropping sharply causes glass to deform and burst. Simultaneously, the transferring process needs vehicular assistance and labor operation, such that production efficiency is relatively low and device temperature is higher with a certain risk.

SUMMARY OF THE INVENTION

In view of the above, it is necessary to provide a continuous strengthening device and a continuous strengthening method thereof, which is able to increase production efficiency and yield with a higher safety performance.

A continuous strengthening device comprises a bracket, at least a strengthening furnace and at least a pre-heating/annealing furnace. The strengthening furnace is located below the bracket, and the strengthening furnace comprises a first furnace body and a first movable furnace cover, a first opening is located on the top of the first furnace body; the first movable furnace cover is movably located on the top of the first furnace body for sealing the first opening; the pre-heating/annealing furnace is movably located on the bracket, and the pre-heating/annealing furnace comprises a second furnace body and a second movable furnace cover; a second opening is located on the bottom of the second furnace body; and the second movable furnace cover is movably located on the bottom of the second furnace body for sealing, the second opening; wherein, upon movement of the pre-heating/annealing furnace onto the strengthening furnace, the first movable furnace cover and the second movable furnace cover both open, so that the second furnace body of the pre-heating/annealing furnace and the first furnace body of the strengthening furnace are connected to form an airtight space. As a result, work-pieces can be transferred in the airtight space.

In an embodiment, the continuous strengthening device further comprises a lead rail located on the bracket, and a movable chain wheel are located on the second furnace body of the pre-heating/annealing furnace for corresponding to the lead rail.

In an embodiment, the strengthening furnace further comprises a first driving component for driving the first movable furnace cover to move correspondingly to the first furnace body, wherein the first driving component comprises a driving part having a shaft, a transmission wheel located on one side of the first movable furnace cover, a driving wheel connected to the shaft of the driving part, and a chain sleeved on the transmission wheel and the driving wheel, the driving wheel drives the transmission wheel to rotate by the chain.

In an embodiment, the driving part drives the driving wheel to rotate by means of chain transmission, gear transmission or belt transmission.

In an embodiment, a shell of the first furnace body is formed of a heat insulating layer which comprising: an outer layer made of a mirror-like stainless steel plate; a middle layer made of heat insulating cotton; and an inner layer made of a stainless steel plate.

In an embodiment, shells of the first furnace body and the second furnace body are match with each other to form the airtight space.

In an embodiment, a cover is movably located in the second furnace body. When the second movable furnace cover and the first movable furnace cover open, the cover slides onto the first opening of the first furnace body, so as to jointly form the airtight space between the second furnace body and the first furnace body.

In an embodiment, the strengthening, furnace further comprises a suspension basket used for carrying work pieces, wherein the suspension basket can be housed in the first furnace body and the second furnace body.

In an embodiment, the strengthening furnace further comprises a suspension device located in the second furnace body for hanging the suspension basket in the second furnace body, wherein the suspension device comprises a suspension driving part located on the top of the second furnace body; a suspension chain located in the second furnace body and connected to the suspension driving part; a suspension board housed in the second furnace body and connected to the suspension chain, wherein the suspension driving part drives the suspension board up and down by the suspension chain; and a suspension hook fixed on the suspension board for hanging the suspension basket.

In an embodiment, the suspension basket comprises a frame formed of a plurality of columns; a plurality of interlayer located in the frame and connected to a part of the columns for dividing the inter space of the frame into multiple layers for placing the work pieces on the interlayer; and a suspension bracket fixed on the top of the frame; wherein, the suspension bracket is hung by the suspension hook of the suspension device.

In an embodiment, the interlayer is formed of a plurality of support bars which are set in parallel and at intervals.

In an embodiment, universal wheels are located on the bottom of the first furnace body.

In an embodiment, the strengthening furnace further comprises an operation control system, wherein the operation control system comprises a control device used for receiving input commands and outputting control commands; and a display screen used for inputting commands and displaying work condition of the strengthening furnace and the pre-heating/annealing furnace.

A continuous strengthening method for a continuous strengthening device, the method comprising following steps: placing work pieces in a pre-heating/annealing furnace of the continuous strengthening device for pre-heating; moving the pre-heating/annealing furnace onto a strengthening furnace of the continuous strengthening device, wherein both a first movable furnace cover of the strengthening furnace and a second movable furnace cover of the pre-heating/annealing furnace open, and wherein the work pieces move from the pre-heating/annealing furnace into the strengthening furnace for strengthening; moving the pre-heating/annealing furnace onto the strengthening furnace, wherein both the first movable furnace cover and the second movable furnace cover open, and wherein the work pieces move from the strengthening furnace into the pre-heating/annealing furnace for annealing.

A continuous strengthening method for a continuous strengthening device, the method comprising: 1) placing work pieces in a first pre-heating/annealing furnace of the continuous strengthening device for pre-heating; 2) upon pre-heating the work pieces, the first pre-heating/annealing furnace moves onto a strengthening furnace of the continuous strengthening device, and wherein both a second movable furnace cover of the first pre-heating/annealing furnace and a first movable furnace cover of the strengthening furnace open, and wherein the work pieces move from the first pre-heating/annealing furnace into the strengthening furnace for strengthening; 3) upon strengthening the work pieces, a second pre-heating/annealing furnace moves onto the strengthening furnace, and wherein both the first movable furnace cover of the strengthening furnace and a third movable furnace cover of the second pre-heating/annealing furnace open, and wherein the work pieces move from the strengthening furnace into the second pre-heating/annealing furnace for annealing; and 4) repeating the steps 1-3.

A continuous strengthening method for a continuous strengthening device, the method comprising: 1) placing a first plurality of work pieces in a pre-heating/annealing furnace of the continuous strengthening device for pre-heating; 2) upon preheating the first plurality of work pieces, moving the pre-heating/annealing furnace onto a first strengthening furnace, wherein both a first movable furnace cover of the first strengthening furnace and a second movable furnace cover of the pre-heating/annealing furnace open, and wherein the first plurality of work pieces move from the pre-heating/annealing furnace into the first strengthening furnace for strengthening; 3) moving the pre-heating/annealing furnace to a side of the a bracket; 4) placing a second plurality of work pieces in the pre-heating/annealing furnace for pre-heating; 5) upon preheating the second plurality of work pieces, moving the pre-heating/annealing furnace onto a second strengthening furnace, wherein both a third movable furnace cover of the second strengthening furnace and the second movable furnace cover of the pre-heating/annealing furnace open, and wherein the second plurality of work pieces work pieces move from the pre-heating/annealing furnace into the second strengthening furnace for strengthening; 6) upon strengthening the first plurality of work pieces in the first strengthening furnace, the pre-heating/annealing furnace moves onto the first strengthening furnace, wherein both the second movable furnace cover of the pre-heating/annealing furnace and the first movable furnace cover of the first strengthening furnace open, and wherein the first plurality of work pieces move from the first strengthening furnace into the pre-heating/annealing furnace for annealing; 7) upon strengthening the second plurality of work pieces in the second strengthening furnace, the pre-heating/annealing furnace moves onto the second strengthening furnace, wherein both the second movable furnace cover of the pre-heating/annealing furnace and the first movable furnace cover of the second strengthening furnace open, and wherein the second plurality of work pieces move from the second strengthening furnace into the pre-heating/annealing furnace for annealing; and 8) repeating the steps 1-7.

The pre-heating/annealing furnace of the above continuous strengthening device can move onto the strengthening furnace, and the first movable furnace cover of the strengthening furnace and the second movable furnace cover of the pre-heating/annealing furnace both open, so that the second furnace body of the pre-heating/annealing furnace is connected to the first furnace body of the strengthening furnace, and an airtight space is formed between the strengthening furnace and the pre-heating/annealing furnace. It can reduce the contact of the work pieces and external cold air during the whole process, so as to avoid the work pieces exposing and deforming.

Moreover, the work pieces can be moved directly between the pre-heating/annealing furnace and the strengthening furnace without a dead lift, so that production efficiency is increased, and also safety performance is improved due to human is avoided to directly contact with high temperature products. Accordingly, the above continuous strengthening device can increase production efficiency and production yield of work pieces with higher safety performance.

DETAILED DESCRIPTION OF THE EMBODIMENTS

Figure 1:
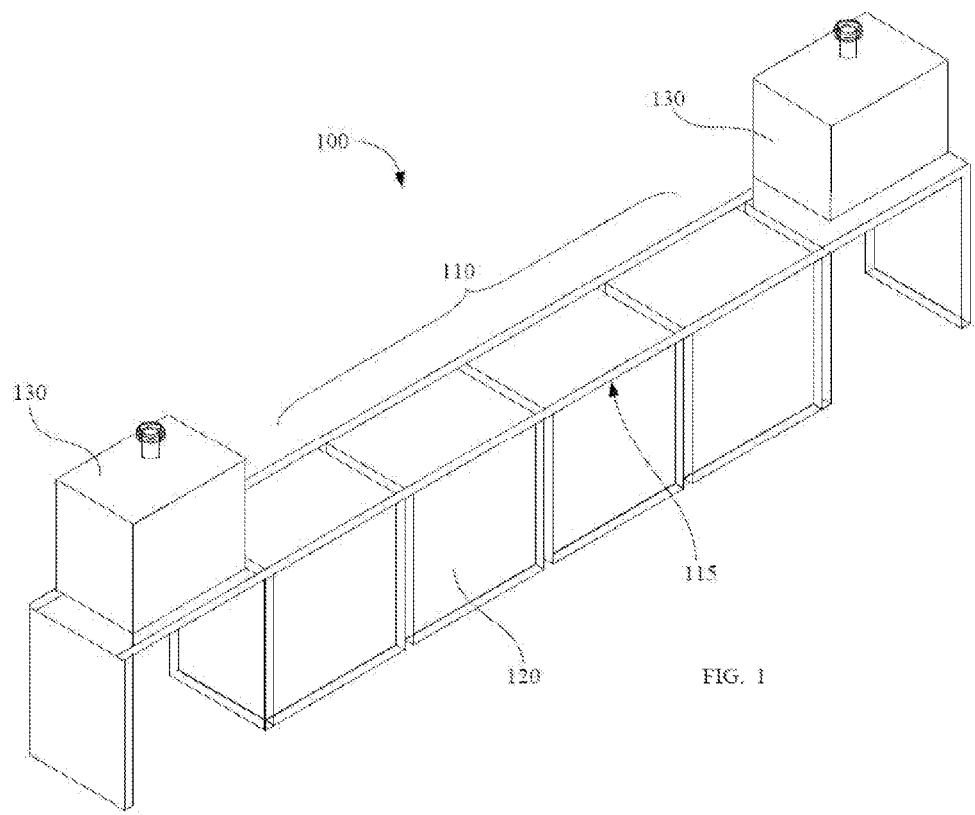
FIG. 1 depicts a three dimensional structural diagram of a continuous strengthening device omitting local parts, in accordance with the present disclosure.
Figure 2:
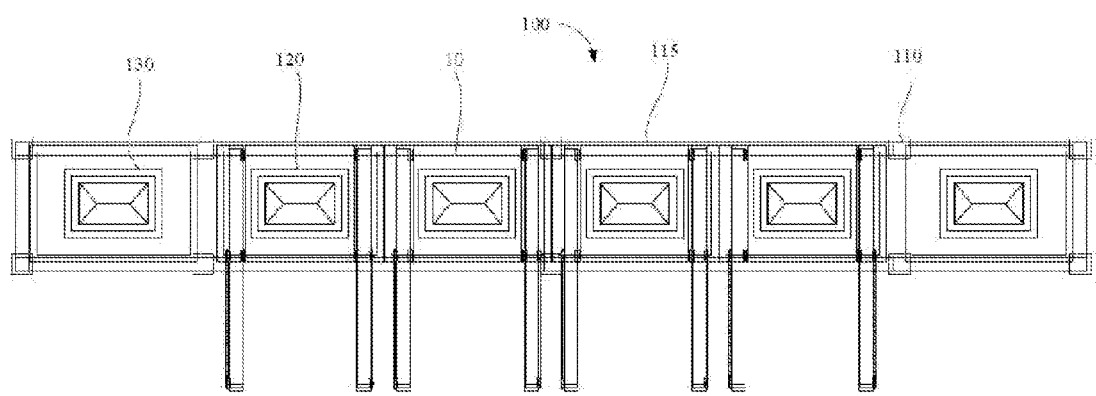
FIG. 2 depicts a top view diagram of the continuous strengthening device as shown in FIG. 1.

FIG. 1 depicts a three dimensional structural diagram of a continuous strengthening device omitting local parts, in accordance with the present disclosure, and FIG. 2 depicts a top view diagram of the continuous strengthening device as shown in FIG. 1. With reference to FIG. 1 and FIG. 2, the continuous strengthening device 100 comprises a bracket 110, at least a strengthening furnace 120 and at least a pre-heating/annealing furnace 130. The strengthening furnace 120 is located below the bracket 110, and the pre-heating/annealing furnace 130 is movably located on the bracket 110. The continuous strengthening device 100 in accordance with an embodiment of the present disclosure can strengthen work pieces 10, such as car glasses, touch glasses and the like glass products.

Figure 3:
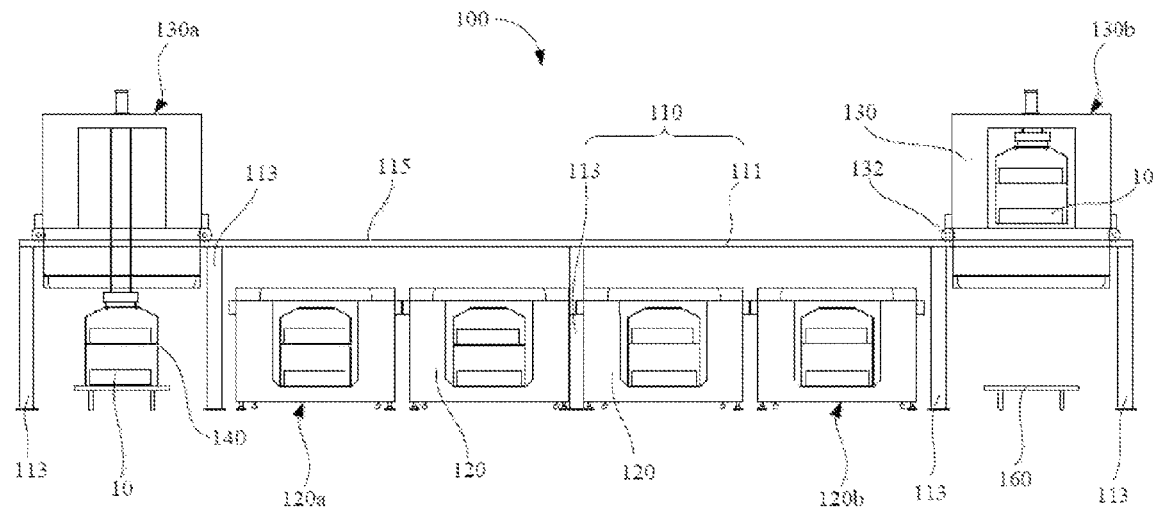
FIG. 3 depicts a main view diagram of the continuous strengthening device as shown in FIG. 1.

FIG. 3 depicts a main view diagram of the continuous strengthening device as shown in FIG. 1, according to one embodiment. With reference to FIG. 3, the bracket 110 is mainly used for supporting the movement of the pre-heating/annealing furnace 130 onto the strengthening furnace 120. Specifically in the present embodiment, the bracket 110 comprises a frame 111 and a plurality of support bars 113, wherein the plurality of support bars 113 are fixed below the frame 111 thereby separating the frame 111 from the ground for a certain height. The pre-heating/annealing furnace 130 is placed on the frame 111, and the strengthening furnace 120 is placed below the frame 111 and located in the space surrounded by the plurality of support bars 113.

Further with reference to FIG. 3 of the present embodiment, in order to enable movement of the pre-heating/annealing furnace 130 on the frame 111, the continuous strengthening device 100 further comprises a lead rail 115 located on the frame 111. The pre-heating/annealing furnace 130 comprises a plurality of movable chain wheels 132, and the movable chain wheels 132 are located on the outside of the second furnace body of the pre-heating/annealing furnace 130 for corresponding to the lead rail 115. The manner of movement of the pre-heating/annealing furnace 130 on the frame 111 is not limited to the movable chain wheel 132 and the lead rail 115 arrangement, for example, a plurality of fixed pulleys (not shown here) are fixed on the frame 111, and the plurality of fixed pulleys are arranged along a direction of length of the frame 111, so as to enable movement of the pre-heating/annealing furnace 130 on the plurality of fixed pulleys.

Figure 4:
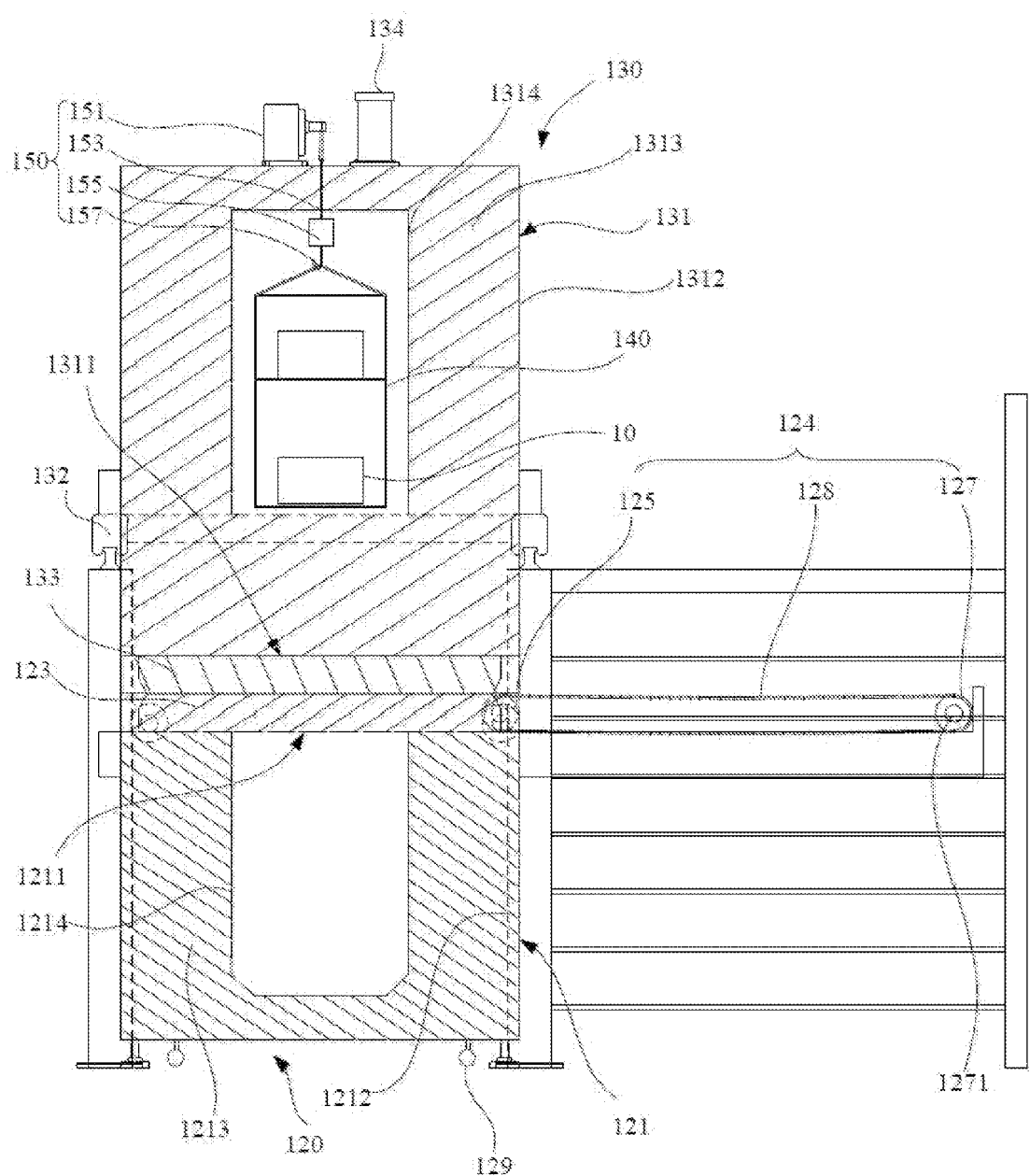
FIG. 4 depicts a state view diagram of corporation of a strengthening furnace and a pre-heating/annealing furnace of a continuous strengthening device, in accordance with a first embodiment of the present disclosure.

FIG. 4 depicts a state view diagram of incorporation of the strengthening furnace and the pre-heating/annealing furnace of the continuous strengthening device, in accordance with a first embodiment of the present disclosure. With reference to FIG. 4, the strengthening furnace 120 comprises a first furnace body 121 and a first movable furnace cover 123. A first opening 1211 is located on the top of the first furnace body 121. In operation, the work pieces 10 can move into the first furnace body 121 from the pre-heating/annealing furnace 130 through the first opening 1211. The first movable furnace cover 123 is movably located on the top of the first furnace body 121 for sealing the first opening 1211.

Specifically in the present embodiment, the strengthening furnace 120 further comprises a first driving component 124 for driving the first movable furnace cover 123 to move correspondingly to the first furnace body 121. The first driving component 124 comprises a driving part (not shown here), a transmission wheel 125, a driving wheel 127 and a chain 128. For example, in some embodiments, the driving part can be an electro-motor and the like. The transmission wheel 125 is located on one side of the first movable furnace cover 123. The driving wheel 127 is connected with the driving part. The chain 128 is sleeved on the transmission wheel 125 and the driving wheel 127. The driving wheel 127 drives the transmission wheel 125 to rotate by the chain 128 thereby facilitating opening or closure of the first movable furnace cover 123 of the strengthening furnace 120.

In general, an embodiment of the driving part (not shown here) rotates the driving wheel 127 by means of chain transmission, gear transmission or belt transmission. In the embodiment as shown in FIG. 4, there are two driving wheels 127, which are respectively located on two ends of a first shaft 1271, and the driving part drives the first shaft 1217 to rotate, so as to drive the driving wheel 127 on the first shaft 1271 to rotate.

Continuously with reference to FIG. 4, to improve heat insulating property, the shell of the first furnace body 121 is formed of a first heat insulating layer, which comprises an outer layer 1212, a middle layer 1213 and an inner layer 1214. The outer layer 1212 is made of a mirror-like stainless steel plate. The middle layer 1213 is made of a heat insulating material, and specifically in the present embodiment, the middle layer 1213 is a heat insulating cotton. The inner layer 1214 is made of a stainless steel plate.

In addition, to move the strengthening furnace 120 conveniently, universal wheels 129 are located on the bottom of the first furnace body 121 of the strengthening furnace 120.

Continuously with reference to FIG. 4, the pre-heating/annealing furnace 130 comprises a second furnace body 131 and a second movable furnace cover 133. A second opening 1311 is located on the bottom of the second furnace body 131. The work pieces 10 are placed in the second furnace body 131 through the second opening 1311. The second movable furnace cover 133 is movably located on the bottom of the second furnace body 131 for sealing the second opening 1311.

To improve heat insulating property of the pre-heating/annealing furnace 130, the shell of the second furnace body 131 is formed of a second heat insulating layer, which comprises an outer layer 1312, a middle layer 1313 and an inner layer 1314. The outer layer 1312 is made of a mirror-like stainless steel plate. The middle layer 1313 is made of a heat insulating material. Specifically in the present embodiment, the middle layer 1313 is a heat insulating cotton. The inner layer 1314 is made of a stainless steel plate.

Figure 5:
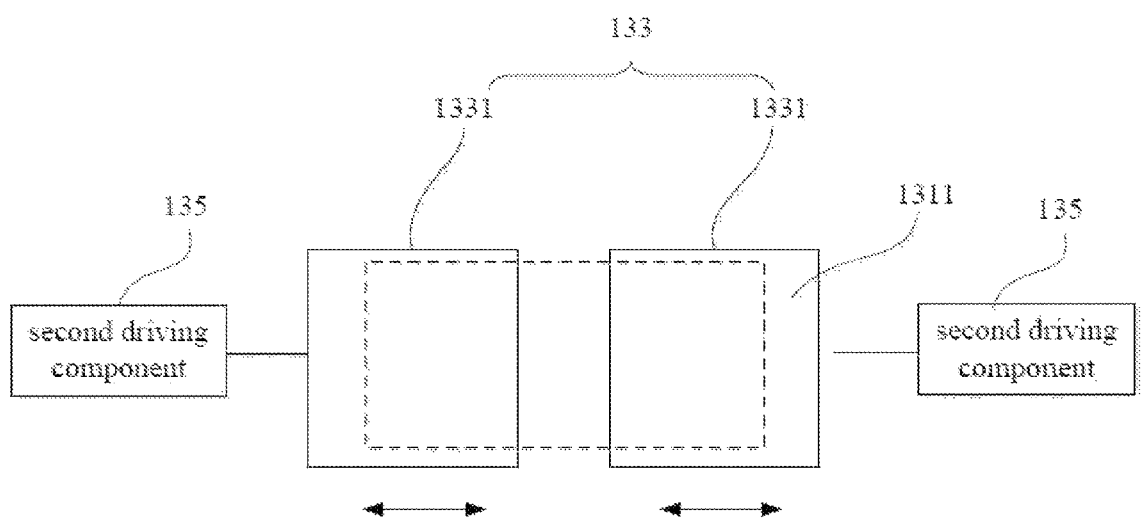
FIG. 5 depicts a state view diagram of a second driving part of a strengthening furnace and a pre-heating/annealing furnace of a continuous strengthening device driving a second movable furnace cover.

FIG. 5 depicts a state view diagram of a second driving component of the strengthening furnace and the pre-heating/annealing furnace of the continuous strengthening device driving the second movable furnace cover, as shown in FIG. 4. With reference to FIG. 5, the second movable furnace cover 133 comprises two slide boards 1331, two second driving components 135 correspondingly located to respectively drive the two slide boards 1331 to slide. The two slide boards 1331 oppositely slide to each other to close the second opening 1311, and backward slide to open the second opening 1311. In some other embodiments, structures and driving methods of the second movable furnace cover 133 and the second driving component 135 of the pre-heating/annealing furnace 130 can be same as those of the first movable furnace cover 123 and the first driving component 124 of the strengthening furnace 120.

With reference to FIG. 3 and FIG. 4, upon moving the pre-heating/annealing furnace 130 onto the strengthening furnace 120, both the first movable furnace cover 123 of the strengthening furnace 120 and the second movable furnace cover 133 of the pre-heating/annealing furnace 130 open, in order that the second furnace body 131 of the pre-heating/annealing furnace 130 and the first furnace body 121 of the strengthening furnace 120 are connected to form an airtight space, and the work pieces 10 transfer in the airtight space. Specifically in the embodiment as shown, there are more than two pre-heating/annealing furnaces 130, which are respectively located on both ends of a bracket 110; the strengthening furnace 120 is located at the middle position of the bracket 110, and the pre-heating/annealing furnace 130 can move from both ends of the bracket 110 onto the strengthening furnace 120.

Specifically in the present embodiment, the shell of the first furnace body 121 of the strengthening furnace 120 and of the second furnace body 131 of the pre-heating/annealing furnaces 130 are match with each other to form an airtight space. In other words, the furnace chamber formed by the inner layer 1214 of the first furnace body 121 and the furnace chamber formed by the inner layer 1314 of the second furnace body 131 are match to form the airtight space. The work pieces 10 transfer in the airtight space without contacting with external air.

Figure 6:
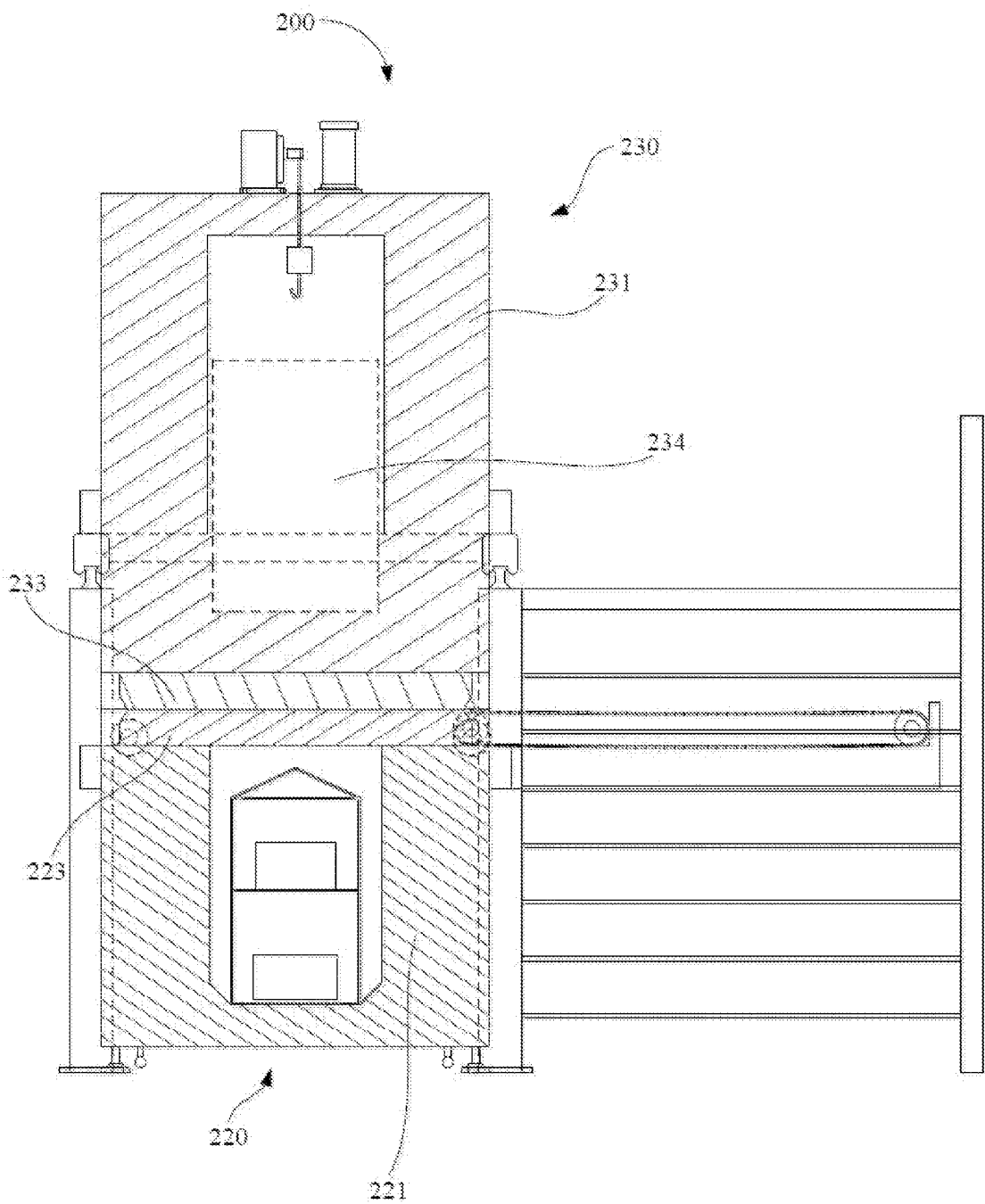
FIG. 6 depicts a state view diagram of corporation of a strengthening furnace and a pre-heating/annealing furnace of a continuous strengthening device, in accordance with a second embodiment of the present disclosure.

In some embodiments, a suitable arrangement or configuration to further reduce contact with external air during transferring the work pieces 10 between the pre-heating/annealing furnaces 130 and the strengthening furnace 120 is disclosed. FIG. 6 is a state view diagram of an incorporation of the strengthening furnace and the pre-heating/annealing furnace of the continuous strengthening device, in accordance with a second embodiment of the present disclosure. With reference to FIG. 6, the continuous strengthening device 200 is basically same as the continuous strengthening device 100 of the first embodiment, as shown in FIG. 4. However, in the continuous strengthening device 200, a cover 234 is movably located in a second furnace body 231 of a pre-heating/annealing furnace 230. The cover 234 slides onto the open end of the first furnace body 221 when the second movable furnace cover 233 and the first movable furnace cover 223 opened, so as to form an airtight space between the second furnace body 231 and the first furnace body 221.

Again with reference to FIG. 4, a circulating fan 134 is located on the top of the second furnace body 131 of the pre-heating/annealing furnaces 130 for providing a circulating hot air in the second furnace body 131, so as to fast pre-heat the work pieces 10 in the second furnace body 131.

Continuously with reference to FIG. 4, to easily place the work pieces 10 into the pre-heating/annealing furnace 130 and transfer the work pieces 10 into the strengthening furnace 120, the continuous strengthening device further comprises a suspension basket 140 and a suspension device 150.

The suspension basket 140 is used for carrying the work pieces 10. Specifically in the present embodiment, the work pieces 10 can be placed in a basket (not shown), and the basket is placed in the suspension basket 140. The suspension basket 140 can be housed in the first furnace body 121 of the strengthening furnace 120 and the second furnace body 131 of the pre-heating/annealing furnaces 130. The suspension device 150 is located on the upper part of the second furnace body 131 of the pre-heating/annealing furnaces 130 for hanging the suspension basket 140 in the second furnace body 131 of the pre-heating/annealing furnaces 130.

The suspension device 150 comprises a suspension driving part 151, a suspension chain 153, a suspension board 155 and a suspension hook 157. The suspension driving part 151 is located on the top of the second furnace body 131 of the pre-heating/annealing furnaces 130. The suspension chain 153 is located in the second furnace body 131 of the pre-heating/annealing furnaces 130 and connected to the suspension driving part 151. The suspension board 155 is connected to the suspension chain 153, wherein the suspension driving part 151 drives the suspension board 155 upwards and downwards using the suspension chain 153. The suspension hook 157 is fixed on the suspension board 155 for hanging the suspension basket 140.

Figure 7:
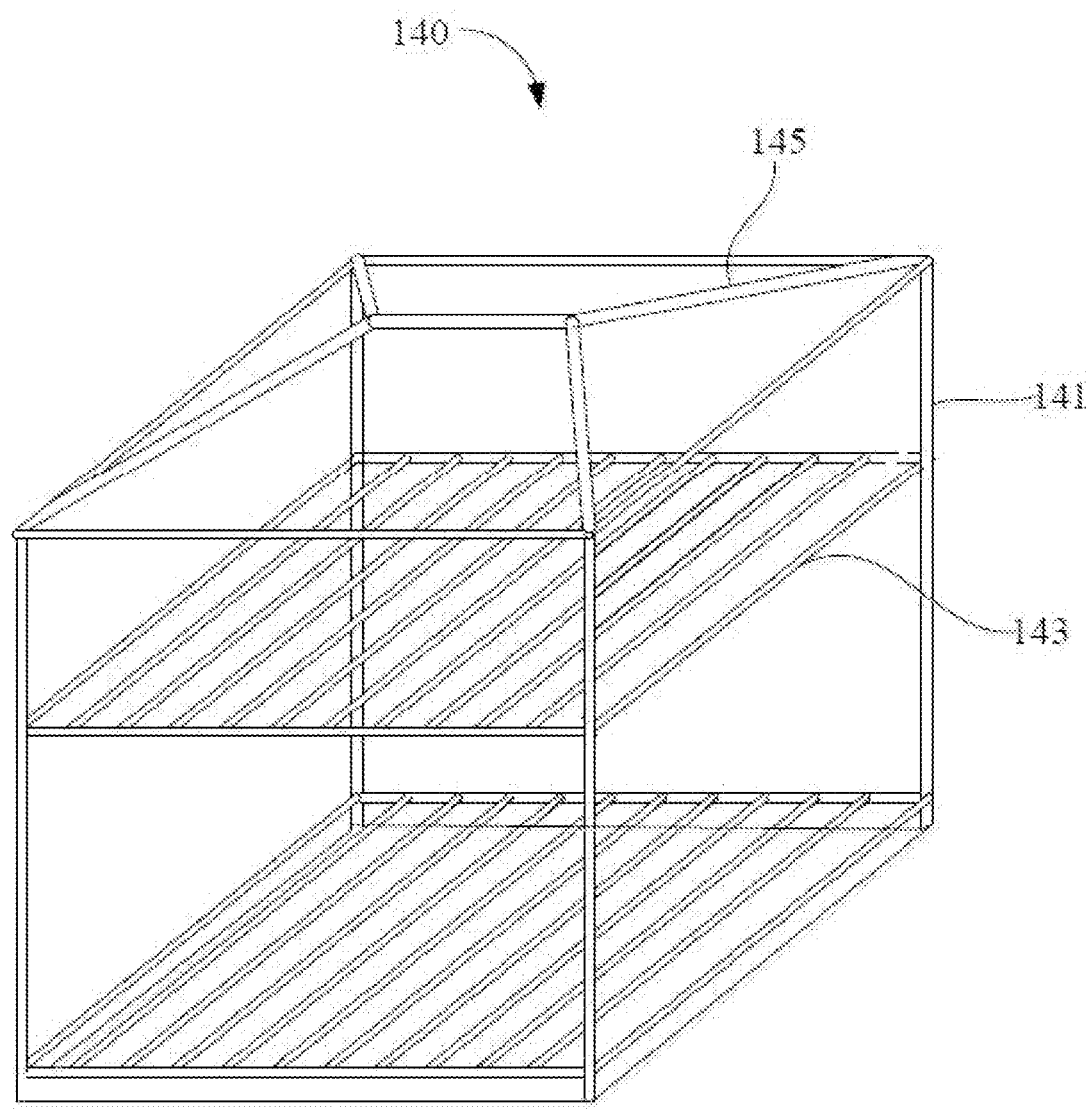
FIG. 7 depicts a structural diagram of a suspension basket of a continuous strengthening device.
Figure 8:
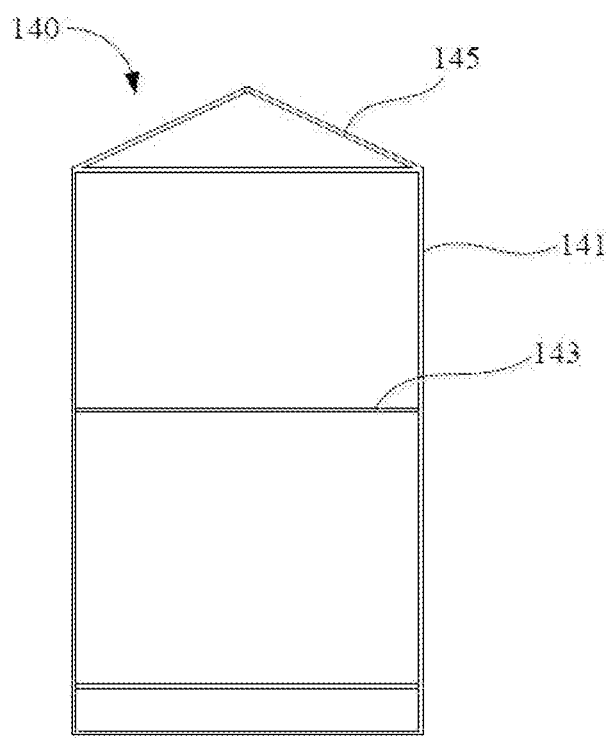
FIG. 8 depicts a side view diagram of the suspension basket as shown in FIG. 7.

FIG. 7 depicts a structural diagram of a suspension basket of a continuous strengthening device. FIG. 8 depicts a side view diagram of the suspension basket as shown in FIG. 7. With reference to FIGS. 7 and 8, the suspension basket 140 comprises a frame 141, a plurality of interlayer 143 and a suspension bracket 145. The frame 141 is a rectangular frame formed of a plurality of columns. The plurality of interlayer 143 are formed of a plurality of support bars arranged in parallel and at intervals, and the plurality of interlayer 143 are located in the frame 141 and fixedly connected (or coupled) with the frame 141 to divide the inner space of the frame 141 into multiple layers for placing the work pieces 10 on the interlayer 143. The suspension bracket 145 is fixed on the top of the frame 141, and the suspension bracket 145 of the suspension basket 140 can be hung by the suspension hook 157 of the suspension device 150.

Figure 9:
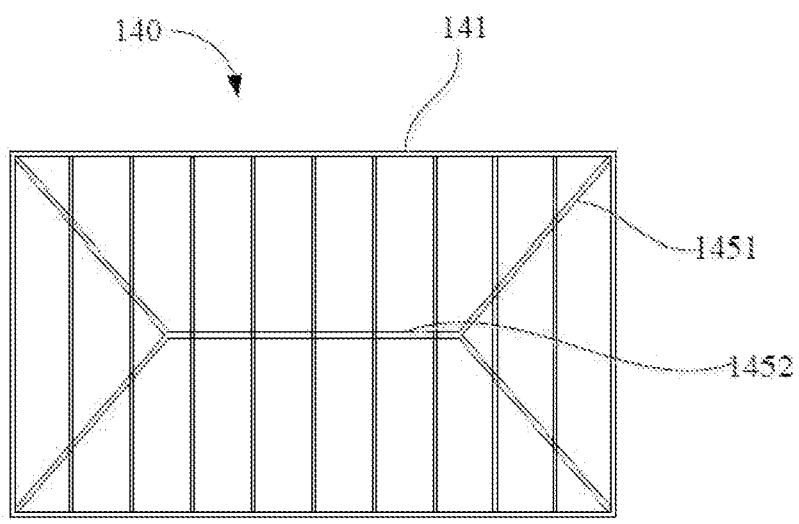
FIG. 9 depicts a top view diagram of the suspension basket as shown in FIG. 7.

FIG. 9 depicts a top view diagram of the suspension basket as shown in FIG. 7. With reference to FIG. 9, the suspension bracket 145 comprises two V-shape poles 1451 and a straight pole 1452. Both the ends of the straight pole 1452 are respectively fixedly connected to the bends of two V-shape poles 1451 to roughly form a roof-like rectangular frame structure. Both the ends of the two V-shape poles 1451 are respectively fixedly connected with four peaks of the top of the frame 141. Since the suspension basket 140 is a hollow frame structure, it is easy to heat the work pieces 10 placed in the suspension basket 140.

The continuous strengthening device 100 further comprises an operation control system (not shown here) for controlling heating parameters and motion positions of the strengthening furnace 120 and the pre-heating/annealing furnaces 130 and opening state of the first movable furnace cover 123 of the strengthening furnace 120 and the second movable furnace cover 133 of the pre-heating/annealing furnaces 130. The operation control system comprises a control device (not shown) and a display screen (not shown). The control device is used for receiving input commands and outputting control commands, specifically in the present embodiment, the control device is a programmable logic controller, PLC. The display screen is used for inputting commands and displaying work conditions of the strengthening furnace 120 and the pre-heating/annealing furnace 130, specifically in the present embodiment, the display screen can be a touch screen.

Again with reference to FIG. 3, the continuous strengthening device 100 further comprises a import/export station 160, which is movable below both the ends of the bracket 110. The pre-heating/annealing furnaces 130 can move onto the import/export station 160 for at least one of hanging the suspension basket 140 placed on the import/export station 160 into the pre-heating/annealing furnaces 130 and placing the suspension basket 140 in the pre-heating/annealing furnaces 130 onto the charge/discharge station 160.

The pre-heating/annealing furnaces 130 of the continuous strengthening device 100 can move onto the strengthening furnace 120, and the first movable furnace cover 123 of the strengthening furnace 120 and the second movable furnace cover 133 of the pre-heating/annealing furnace 130 both open, so that the second furnace body 131 of the pre-heating/annealing furnace 130 is connected with the first furnace body 121 of the strengthening furnace 120, and an airtight space is formed between the strengthening furnace 120 and the pre-heating/annealing furnace 130. It can reduce the contact of the work pieces 10 and external cold air during the whole process, so as to avoid the work pieces 10 exposing and deforming.

Moreover, the work pieces 10 can directly move from the strengthening furnace 120 into the pre-heating/annealing furnace 130 without a dead lift, so that production efficiency is increased, and also safety performance is improved due to human is avoided to directly contact with high temperature products. Accordingly, the continuous strengthening device 100 can increase production efficiency to achieve fully automatic production and manufacture, so that production yield of the work pieces 10 and safety performance are higher.

Figure 10:
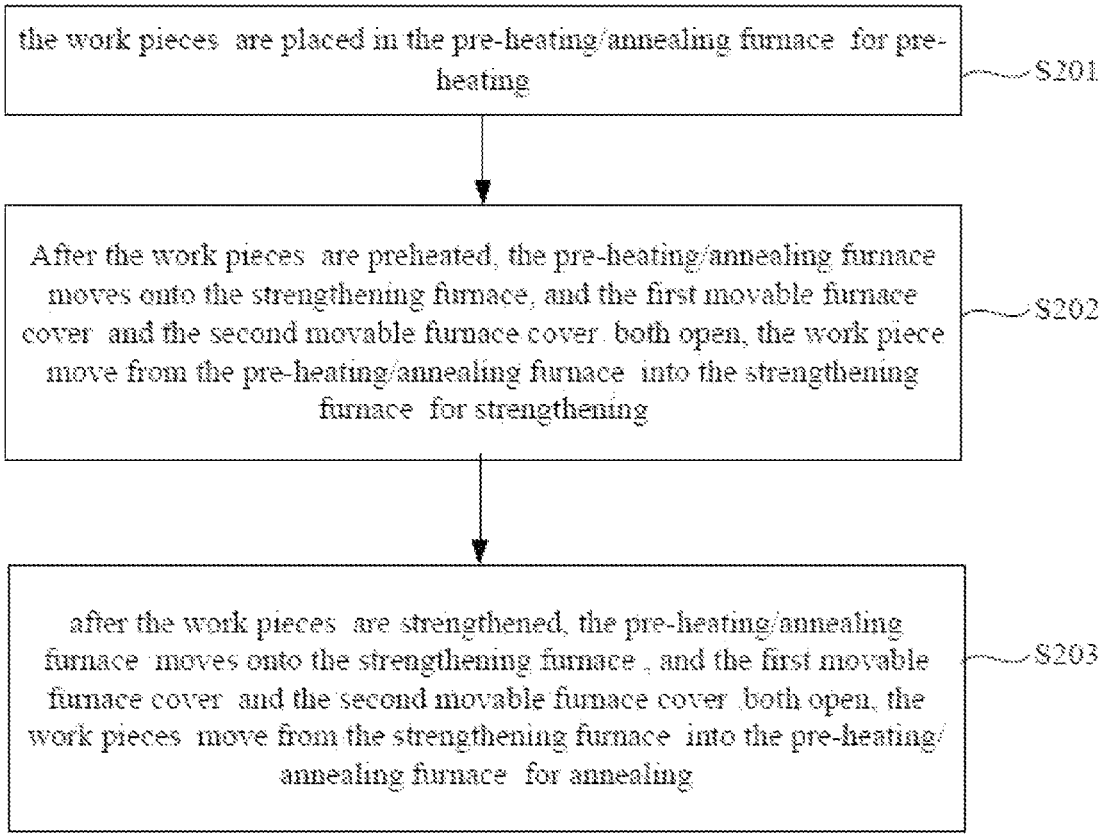
FIG. 10 depicts a flow diagram of a continuous strengthening method, in accordance with a first embodiment of the present disclosure.

FIG. 10 depicts a flow diagram of a first continuous strengthening method, in accordance with a first embodiment of the present disclosure. With reference to FIG. 3, FIG. 4 and FIG. 10, the first continuous strengthening method utilizes the continuous strengthening device 100 to strengthen the work pieces 10 such as glasses. The first continuous strengthening method comprises the following steps:

Step S201, the work pieces 10 are placed in the pre-heating/annealing furnace 130 for pre-heating.

Step S202 upon pre-heating the work pieces 10, the pre-heating/annealing furnace 130 moves onto the strengthening furnace 120. Both the first movable furnace cover 123 and the second movable furnace cover 133 open. The work-piece 10 moves from the pre-heating/annealing furnace 130 into the strengthening furnace 120. The first movable furnace cover 123 close for strengthening the work-piece 10.

Step S203, upon strengthening the work pieces 10, the pre-heating/annealing furnace 130 moves onto the strengthening furnace 120. Both the first movable furnace cover 123 and the second movable furnace cover 133 open. The work pieces 10 move from the strengthening furnace 120 into the pre-heating/annealing furnace 130. The second movable furnace cover 133 open for annealing the work-piece 10.

Figure 11:
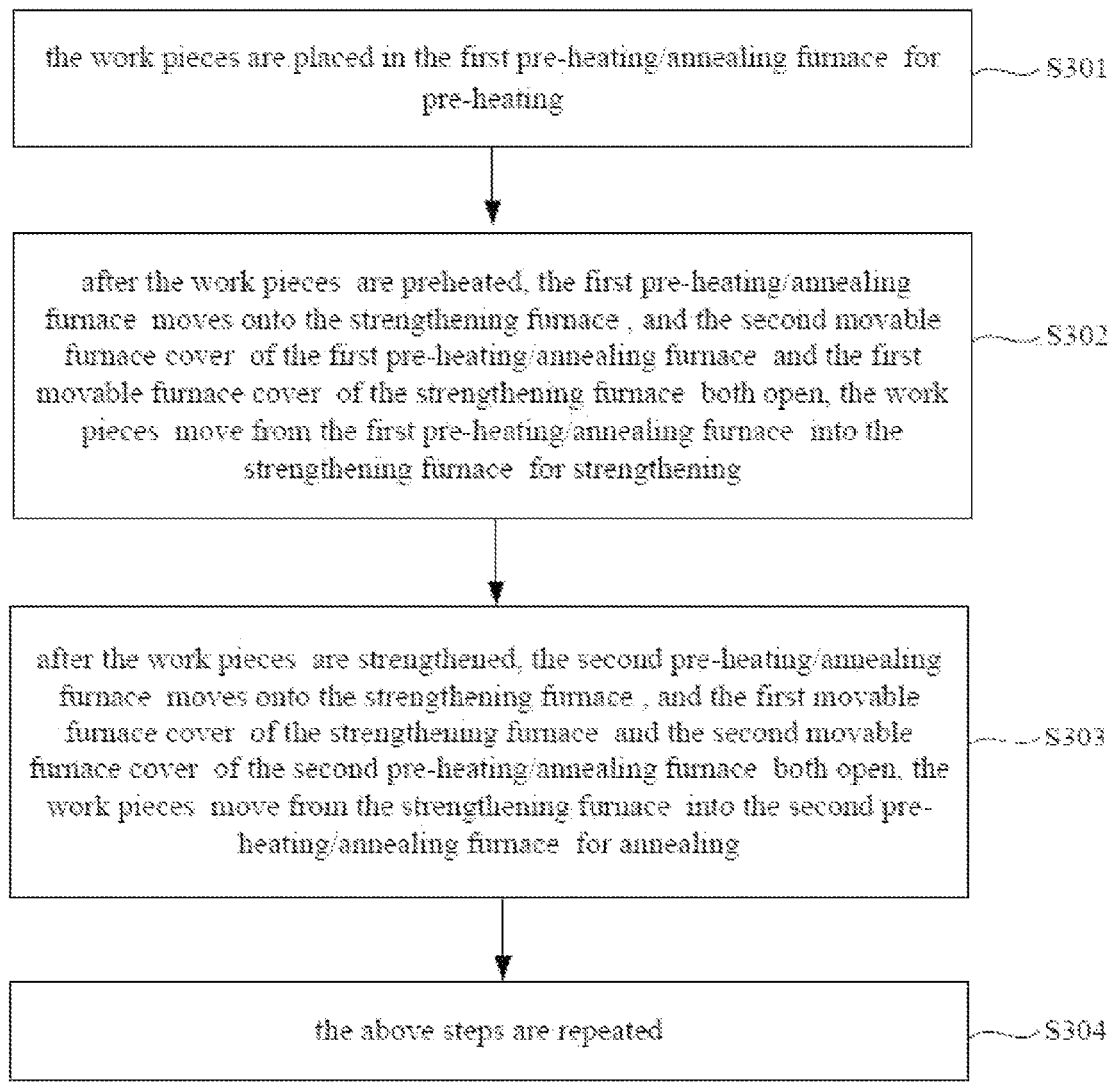
FIG. 11 depicts a flow diagram of a continuous strengthening method in accordance with a second embodiment of the present disclosure.

FIG. 11 depicts a flow diagram of a second continuous strengthening method, in accordance with a second embodiment of the present disclosure. With reference to FIG. 3 and FIG. 11, the second continuous strengthening method utilizes the continuous strengthening device 100 and at least two pre-heating/annealing furnaces 130, wherein the two pre-heating/annealing furnaces 130 are respectively a first pre-heating/annealing furnace 130a and a second pre-heating/annealing furnace 130b. The second continuous strengthening method comprises the following steps:

Step S301, the work pieces 10 are placed in the first pre-heating/annealing furnace 130a for pre-heating.

Step S302, upon pre-heating the work pieces 10, the first pre-heating/annealing furnace 130a moves onto the strengthening furnace 120. Both the second movable furnace cover 133 of the first pre-heating/annealing furnace 130a and the first movable furnace cover 123 of the strengthening furnace 120 open. The work-piece 10 moves from the first pre-heating/annealing furnace 130a into the strengthening furnace 120 for strengthening.

Step S303, upon strengthening the work pieces 10, the second pre-heating/annealing furnace 130b moves onto the strengthening furnace 120. Both the first movable furnace cover 123 of the strengthening furnace 120 and the second movable furnace cover 133 of the second pre-heating/annealing furnace 130b open. The work pieces 10 move from the strengthening furnace 120 into the second pre-heating/annealing furnace 130b for annealing.

Step S304, the above steps S301-S303 are repeated.

In the second embodiment, since the work pieces need to be placed in the pre-heating annealing furnace for pre-heating before strengthening, and placed in the pre-heating/annealing furnace for annealing after strengthening. One strengthening furnace may correspond to a plurality of pre-heating/annealing furnace to improve strengthening efficiency of the work pieces.

The third continuous strengthening method, in accordance with a third embodiment of the present disclosure, is disclosed as follows. With reference to FIG. 3, the third continuous strengthening method utilizes the continuous strengthening device 100 comprising one pre-heating/annealing furnace and two strengthening furnaces, wherein the two strengthening furnaces are respectively a first strengthening furnace 120a and a second strengthening furnace 120b. The third continuous strengthening method comprises the following steps:

At first, a plurality of first work pieces are placed in the pre-heating/annealing furnace 130 for pre-heating.

Upon pre-heating the first work pieces, the pre-heating/annealing furnace 130 moves onto the first strengthening furnace 120a. Both the second movable furnace cover 133 of the pre-heating/annealing furnace 130 and the first movable furnace cover 123 of the first strengthening furnace 120a open. The first work pieces move from the pre-heating/annealing furnace 130 into the first strengthening furnace 120a for strengthening.

Afterwards, the pre-heating/annealing furnace 130 moves to a side of the bracket 110, a plurality of second work pieces are placed in the pre-heating/annealing furnace 130 for pre-heating.

Upon pre-heating the second work pieces, the pre-heating/annealing furnace 130 moves onto the second strengthening furnace 120b. Both the first movable furnace cover 123 of the second strengthening furnace 120b and the second movable furnace cover 133 of the pre-heating/annealing furnace 130 open, the second work pieces move from the pre-heating/annealing furnace 130 into the second strengthening furnace 120b for strengthening.

Upon strengthening the first work pieces in the first strengthening furnace 120a, the pre-heating/annealing furnace 130 moves onto the first strengthening furnace 120a. Both the second movable furnace cover 133 of the pre-heating/annealing furnace 130 and the first movable furnace cover 123 of the first strengthening furnace 120a open. The first work pieces move from the first strengthening furnace 120a into the pre-heating/annealing furnace 130 for annealing.

Upon strengthening the second work pieces in the second strengthening furnace 120b, the pre-heating/annealing furnace 130 moves onto the second strengthening furnace 120b, wherein both the second movable furnace cover 133 of the pre-heating/annealing furnace 130 and the first movable furnace cover 123 of the second strengthening furnace 120b open, and wherein the second work pieces move from the second strengthening furnace 120b into the pre-heating/annealing furnace 130 for annealing.

The above steps are repeated.

In the third embodiment, since the work pieces need to be heated for a longer time in the strengthening furnace, a pre-heating/annealing furnace may correspond to the plurality of strengthening furnaces to fasten strengthening efficiency of the work pieces.

In the above embodiment, numbers of the strengthening furnace and the pre-heating/annealing furnace can be plural, wherein the strengthening furnaces and the pre-heating/annealing furnaces may correspond to each other, alternatively, a strengthening furnace may correspond to a plurality of pre-heating/annealing furnaces or a pre-heating/annealing furnace may correspond to a plurality of strengthening furnaces. The corresponding relationship of the strengthening furnaces and the pre-heating/annealing furnaces may be selected according to temperature of strengthening and temperature and speed of pre-heating/annealing.

The foregoing descriptions are the preferable embodiments of the present disclosure only, but are not limitations. Various modifications can be made thereto without departing from the spirit and scope of the disclosure. All modifications and substitutions to the claims of the present disclosure are defined by the attached claims.

What is claimed is:

1. A continuous strengthening device, comprising:
   a bracket;
   at least a strengthening furnace located below the bracket, wherein the strengthening furnace comprises:
      a first furnace body having a first opening located on the top; and
      a first movable furnace cover movably located on the top of the first furnace body for sealing the first opening; and
   at least a pre-heating/annealing furnace movably located on the bracket, wherein the pre-heating/annealing furnace comprises:
      a second furnace body having a second opening located on the bottom; and
      a second movable furnace cover movably located on the bottom of the second furnace body for sealing the second opening;
      wherein, both the first movable furnace cover and the second movable furnace cover open, and the second furnace body of the pre-heating/annealing furnace and the first furnace body of the strengthening furnace are connected to form an airtight space.

2. The continuous strengthening device of claim 1, further comprising a lead rail located on the bracket.

3. The continuous strengthening device of claim 2, wherein the pre-heating/annealing furnace comprises a plurality of movable chain wheels located on the second furnace body for corresponding to the lead rail.

4. The continuous strengthening device of claim 1, wherein the strengthening furnace further comprises a first driving component for driving the first movable furnace cover to move correspondingly to the first furnace body, and the first driving component comprises:
   a driving part having a shaft;
   a transmission wheel located on one side of the first movable furnace cover;
   a driving wheel connected to the shaft of the driving part; and
   a chain sleeved on the transmission wheel and the driving wheel, wherein the driving wheel drives the transmission wheel to rotate by the chain.

5. The continuous strengthening device of claim 4, wherein the driving part drives the driving wheel to rotate by means of chain transmission, gear transmission or belt transmission.

6. The continuous strengthening device of claim 1, wherein the first furnace body comprises a shell formed by a heat insulating layer, and the heat insulating layer comprises:
   an outer layer made of a mirror-like stainless steel plate;
   a middle layer made of heat insulating cotton; and
   an inner layer made of a stainless steel plate.

7. The continuous strengthening device of claim 1, wherein the first furnace body and the second furnace body match with each other to form the airtight space.

8. The continuous strengthening device of claim 1, further comprising a cover movably located in the second furnace body, wherein when the second movable furnace cover and the first movable furnace cover open, the cover slides onto the first opening of the first furnace body to jointly form the airtight space between the second furnace body and the first furnace body.

9. The continuous strengthening device of claim 1, further comprising a suspension basket used for carrying a plurality of work pieces, wherein the suspension basket can be housed in the first furnace body and the second furnace body.

10. The continuous strengthening device of claim 9, further comprising a suspension device located on the second furnace body for hanging the suspension basket in the second furnace body, wherein the suspension device comprises:
    a suspension driving part located on the top of the second furnace body;
    a suspension chain located in the second furnace body and connected to the suspension driving part;
    a suspension board connected to the suspension chain, wherein the suspension driving part drives the suspension board up and down by the suspension chain; and
    a suspension hook fixed on the suspension board for hanging the suspension basket.

11. The continuous strengthening device of claim 10, wherein the suspension basket comprises:
    a frame formed of a plurality of columns;
    a plurality of interlayer located in the frame and connected to a part of the columns for dividing the inter space of the frame into multiple layers for placing the work pieces; and
    a suspension bracket fixed on the top of the frame, wherein the suspension bracket is hung by the suspension hook of the suspension device.

12. The continuous strengthening device of claim 11, wherein the interlayer is formed of a plurality of support bars, which are set in parallel and at intervals.

13. The continuous strengthening device of claim 1, wherein the strengthening furnace further comprises a plurality of universal wheels located on the bottom of the first furnace body.

14. The continuous strengthening device of claim 1, further comprising an operation control system, wherein the operation control system comprises:
    a control device for receiving input commands and outputting control commands; and
    a display for inputting commands and displaying work condition of the strengthening furnace and the pre-heating/annealing furnace.

15. A continuous strengthening device, comprising:
    a bracket;
    one strengthening furnace located below the bracket, wherein the strengthening furnace comprises:
       a first furnace body having a first opening located on the top; and
       a first movable furnace cover movably located on the top of the first furnace body for sealing the first opening; and
    two pre-heating/annealing furnaces movably located on the bracket, wherein each of the pre-heating/annealing furnaces comprises:
       a second furnace body having a second opening located on the bottom; and
       a second movable furnace cover movably located on the bottom of the second furnace body for sealing the second opening;
       wherein, both the first movable furnace cover and the second movable furnace cover open, and the second furnace body of the pre-heating/annealing furnace and the first furnace body of the strengthening furnace are connected to form an airtight space,
       wherein a first pre-heating/annealing furnace of the two pre-heating/annealing furnaces is configured to receive a plurality of work pieces for preheating, be moved onto the strengthening furnace upon preheating the work pieces, and move the work pieces into the strengthening furnace for strengthening, and wherein a second pre-heating/annealing furnace of the two pre-heating/annealing furnaces is configured to be moved onto the strengthening furnace upon strengthening the work pieces, and receive the work pieces from the strengthening furnace for annealing.

16. The continuous strengthening device of claim 15, wherein the strengthening furnace further comprises a first driving component for driving the first movable furnace cover to move correspondingly to the first furnace body.

17. The continuous strengthening device of claim 15, wherein the first furnace body comprises a shell formed by a heat insulating layer, and wherein the heat insulating layer comprises:
   an outer layer made of a mirror-like stainless steel plate;
   a middle layer made of heat insulating cotton; and
   an inner layer made of a stainless steel plate.

18. A continuous strengthening device, comprising:
   a bracket;
   two strengthening furnaces located below the bracket, wherein each of the strengthening furnaces comprises:
      a first furnace body having a first opening located on the top; and
      a first movable furnace cover movably located on the top of the first furnace body for sealing the first opening; and
   one pre-heating/annealing furnace movably located on the bracket, wherein the pre-heating/annealing furnace comprises:
      a second furnace body having a second opening located on the bottom; and
      a second movable furnace cover movably located on the bottom of the second furnace body for sealing the second opening;
   wherein, both the first movable furnace cover and the second movable furnace cover open, and the second furnace body of the pre-heating/annealing furnace and the first furnace body of the strengthening furnace are connected to form an airtight space,
   wherein the pre-heating/annealing furnace is configured to
   receive a first plurality of work pieces for pre-heating,
   be moved onto a first strengthening furnace upon pre-heating the first plurality of work pieces,
   move the first plurality of work pieces into the first strengthening furnace for strengthening,
   receive a second plurality of work pieces for pre-heating,
   be moved onto a second strengthening furnace upon pre-heating the second plurality of work pieces,
   move the second plurality of work pieces into the second strengthening furnace for strengthening,
   be moved onto the first strengthening furnace upon strengthening the first plurality of work pieces by the first strengthening furnace,
   receive the first plurality of work pieces from the first strengthening furnace for annealing,
   be moved onto the second strengthening furnace upon strengthening the second plurality of work pieces by the second strengthening furnace, and
   receive the second plurality of work pieces from the second strengthening furnace for annealing.

19. The continuous strengthening device of claim 18, wherein the strengthening furnace further comprises a first driving component for driving the first movable furnace cover to move correspondingly to the first furnace body.

20. The continuous strengthening device of claim 18, wherein the first furnace body comprises a shell formed by a heat insulating layer, and the heat insulating layer comprises:
   an outer layer made of a mirror-like stainless steel plate;
   a middle layer made of heat insulating cotton; and
   an inner layer made of a stainless steel plate.

* * * * *